(12) United States Patent
Grigoriev et al.

(10) Patent No.: US 8,444,812 B2
(45) Date of Patent: May 21, 2013

(54) CREPING ADHESIVES WITH IMPROVED FILM PROPERTIES

(75) Inventors: Vladimir A. Grigoriev, Chicago, IL (US); Gary S. Furman, Jr., St. Charles, IL (US); Mingli Wei, Naperville, IL (US); Winston Su, Naperville, IL (US); Christopher D. Kaley, Naperville, IL (US); Bryan M. Schertzer, Geneva, IL (US)

(73) Assignee: Nalco Company, Naperville, IL (US)

( * ) Notice: Subject to any disclaimer, the term of this patent is extended or adjusted under 35 U.S.C. 154(b) by 482 days.

(21) Appl. No.: 12/273,217

(22) Filed: Nov. 18, 2008

(65) Prior Publication Data

US 2010/0122785 A1 May 20, 2010

(51) Int. Cl.
*B31F 1/12* (2006.01)

(52) U.S. Cl.
USPC ........ 162/112; 162/158; 162/164.3; 264/283; 156/183

(58) Field of Classification Search
USPC ............. 162/111–113, 164.3, 168.2–168.3, 162/158; 264/282–283; 156/183
See application file for complete search history.

(56) References Cited

U.S. PATENT DOCUMENTS

| | | | | | |
|---|---|---|---|---|---|
| 3,058,873 | A | * | 10/1962 | Keim et al. | 162/164.3 |
| 4,501,640 | A | * | 2/1985 | Soerens | 162/111 |
| 5,171,795 | A | | 12/1992 | Miller et al. | |
| 5,338,807 | A | * | 8/1994 | Espy et al. | 525/430 |
| 5,382,323 | A | * | 1/1995 | Furman et al. | 162/111 |
| 5,591,306 | A | * | 1/1997 | Kaun | 162/127 |
| 5,660,687 | A | * | 8/1997 | Allen et al. | 162/111 |
| 6,277,242 | B1 | * | 8/2001 | Archer et al. | 162/111 |
| 6,280,571 | B1 | | 8/2001 | Allen | |
| 6,562,194 | B1 | * | 5/2003 | Archer et al. | 162/111 |
| 6,808,597 | B2 | * | 10/2004 | Allen | 162/111 |
| 6,815,497 | B1 | * | 11/2004 | Luu et al. | 525/61 |
| 7,048,826 | B2 | | 5/2006 | Archer et al. | |
| 7,291,695 | B2 | * | 11/2007 | Wei et al. | 524/608 |
| 7,683,121 | B2 | * | 3/2010 | Wei et al. | 524/608 |
| 7,718,035 | B2 | * | 5/2010 | Boettcher et al. | 162/112 |
| 7,744,722 | B1 | * | 6/2010 | Tucker et al. | 162/112 |
| 2002/0045704 | A1 | * | 4/2002 | Luu et al. | 525/60 |
| 2002/0053412 | A1 | * | 5/2002 | Schroeder et al. | 162/111 |
| 2002/0096288 | A1 | | 7/2002 | Allen | |
| 2002/0173580 | A1 | * | 11/2002 | Allen | 524/503 |

(Continued)

FOREIGN PATENT DOCUMENTS

EP 739709 A1 * 10/1996
EP 1109971 10/2004

(Continued)

*Primary Examiner* — Jose A Fortuna
(74) *Attorney, Agent, or Firm* — Benjamin E. Carlsen; Andrew D. Sorensen (57) ABSTRACT

The invention provides a composition of matter used to produce very soft high grades of tissue paper. The composition of matter comprises a PAE resin acidified with a multifunctional acid. The multifunctional acid includes but is not limited to carboxyl and sulfonyl. The acid has a functional group selected from carboxyl and sulfonyl and a functional group selected from carboxyl, sulfonyl, hydroxyl, lactone, phenol, amine and heterocycle. The PAE resin facilitates the use of an adhesive in a Yankee Dryer apparatus that is durable when the adhesive is wet but remains soft when the adhesive becomes dry. These properties allow the adhesive to be strong and remain engaged to the dryer apparatus when wet but be easily removed by the creping blade when dry.

18 Claims, 3 Drawing Sheets

U.S. PATENT DOCUMENTS

| | | | |
|---|---|---|---|
| 2003/0114631 A1* | 6/2003 | Walton et al. | 528/106 |
| 2004/0177940 A1* | 9/2004 | Archer et al. | 162/199 |
| 2005/0217817 A1* | 10/2005 | Wei et al. | 162/164.3 |
| 2005/0222377 A1* | 10/2005 | Wei et al. | 528/310 |
| 2006/0207736 A1* | 9/2006 | Boettcher et al. | 162/112 |
| 2007/0151684 A1 | 7/2007 | Grigoriev et al. | |
| 2007/0208115 A1 | 9/2007 | Grigoriev et al. | |
| 2008/0255320 A1* | 10/2008 | Allen | 525/430 |
| 2009/0133846 A1* | 5/2009 | Grigoriev et al. | 162/112 |
| 2010/0122785 A1* | 5/2010 | Grigoriev et al. | 162/111 |
| 2010/0184902 A1* | 7/2010 | Boettcher et al. | 524/417 |

FOREIGN PATENT DOCUMENTS

| | | |
|---|---|---|
| JP | 2688950 | 5/1990 |
| JP | 2688950 B2 | 12/1997 |
| WO | 2004031475 | 4/2004 |
| WO | WO 2004061237 A1 * | 7/2004 |
| WO | WO 2005098130 A2 * | 10/2005 |
| WO | WO 2007079064 A2 * | 7/2007 |
| WO | WO 2008067243 A1 * | 6/2008 |
| WO | WO 2008089419 A1 * | 7/2008 |
| WO | WO 2009070647 A1 * | 6/2009 |
| WO | WO 2010059699 A1 * | 5/2010 |

* cited by examiner

CREPING ADHESIVES WITH IMPROVED FILM PROPERTIES

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to compositions of matter and methods of using them to improve the physical properties of manufactured paper, in particular making particularly soft tissue paper. Typically, tissue paper obtains its characteristic properties of softness, bulk, absorbency, and ability to stretch, by a process involving a Yankee Dryer apparatus. In conventional tissuemaking the tissue is fed to the Yankee Dryer apparatus as a wet fiber web. The wet fiber web is largely dewatered at a pressure roll nip where the sheet is transferred to the surface of a Yankee Dryer cylinder. At this point, the paper web typically has 35-40% consistency (it is 65-60% water). The Sheet is further dried on the hot Yankee Dryer cylinder to 90-97% consistency and removed with a doctor blade. The mechanical action of the blade results in a disruption of the fiber-fiber bonds, which forms a microfold structure that gives the tissue paper its characteristic properties. This process is referred to as creping.

In order to properly crepe a paper web to make soft tissue paper, the paper web has to adhere to the surface of the Yankee dryer cylinder. The doctor blade then forms microfolds by compressing or shortening the paper web in the machine direction while at the same time separating it from the drying cylinder. This adhesion is facilitated by the application of an adhesive to the surface of the dryer cylinder. In addition, wet-end furnish components can also contribute to the adhesion that occurs. Commonly used Yankee adhesives are synthetic polymers such as polyaminoamide-epichlorohydrin resins, polyamine-epichlorohydrin resins, polyvinyl alcohols, polyvinyl acetates, polyacrylamides, polyamines, polyamides, polyvinylpyrrolidones and polyethers. Other natural and derivitized natural polymers may also be employed including starch, guar gum, carboxymethyl cellulose, hydroxyethyl cellulose, hydroxypropyl cellulose and the like. Various low molecular weight compounds, oils and surfactants, are used to modify the properties of these adhesives.

The tissue industry has a continuing interest in manufacturing premium grade tissues, which are tissues with high levels of softness. Improvements in softness can be obtained by modifying the fiber source, implementing particular forming and drying strategies, creping the fiber sheets, and by using wet-end or topical application of softening agents. Creping the paper sheet when it has a very low sheet moisture level (<3%) is one of the most effective ways of achieving desired levels of high softness. At low moisture levels, the sheet and the coating tend to adhere to each other more strongly which causes the sheet to debond in the Z-direction more efficiently thereby generating greater bulk and softness.

Despite the benefits for tissue softness, low moisture creping is not being widely practiced due to coating runnability issues. Conventional creping adhesives typically develop a hard coating which is less rewettable after undergoing the extensive drying that is required for low moisture creping. This hard coating results in a loss of adhesion and also results in blade vibration (chatter), which can cause non-uniform creping, blade wear, and, in extreme cases, damage to the Yankee dryer cylinder surface. Thus there is a great demand for a creping adhesive that remains soft and rewettable under extreme drying conditions.

BRIEF SUMMARY OF THE INVENTION

At least one embodiment of the invention is directed towards a composition comprising a polyaminoamide epihalohydrin (PAE) resin acidified with at least one multifunctional acid. The acid has at least two functional groups one being a first functional group and one being a second functional group. The first functional group is selected from carboxyl and sulfonyl. The second functional group is selected from carboxyl, sulfonyl, hydroxyl, lactone, phenol, amine, or heterocycle.

At least one embodiment of the invention is directed towards a composition having a PAE resin that is prepared by reacting epichlorohydrin with a polyaminoamide prepared by reacting one or more aliphatic or aromatic dicarboxylic acid derivatives with one or more polyalkylene polyamines. This is done in a mole ratio of about 0.8:1 to about 1.4:1 with about 0.01 to about 1.8 molar equivalents of epihalohydrin, based on secondary amino groups of the polyaminoamide. In this composition the PAE resin can have a weight-average molecular weight of about 10,000 to about 5,000,000 Daltons. The epihalohydrin can be epichlorohydrin.

At least one embodiment of the invention is directed towards a composition wherein the PAE resins are prepared by reacting the polyaminoamide with about 0.05 to about 0.8 molar equivalents of epichlorohydrin, based on secondary amino groups of the polyaminoamide. The polyaminoamide can be the reaction product of diethylenetriamine and a dicarboxylic acid derivative selected from adipic acid, glutaric acid, DBE-2 dibasic ester, dimethyl glutarate and dimethyl adipate or a mixture thereof. The PAE resins can be prepared by reacting the polyaminoamide with about 0.1 to about 0.3 molar equivalents of epichlorohydrin, based on secondary amino groups of the polyaminoamide. The PAE resins can also be a terpolymer of adipic acid, diethylenetriamine and epichlorohydrin.

At least one embodiment of the invention is directed towards a composition in which at least one multifunctional acid is selected from oxalic, malonic, succinic, glutaric, adipic, pimelic, suberic, azelaic, sebacic, phthalic, isophthalic, terephthalic, citric, isocitric, aconitic, carballylic, glycolic, lactic, malic, tartaric, gluconic, maleic, fumaric, ascorbic, aspartic, glutamic, 4-hydroxy-benzoic, 2,4-dihydroxy benzoic, sulfamic, methanesulfonic, 4-toluene sulfonic, xylene sulfonic, phenol sulfonic, and any combination thereof. The first and second functional groups can be different kinds of groups. The molar ratio of multifunctional acid to the PAE polymer secondary amines can be from about 0.01 to about 5. A more preferred ratio is from about 0.1 to about 2. The most preferred ratio is from about 0.2 to about 1.

In addition to multifunctional acid, a PAE resin can comprise one or more mineral acids. The mineral acid can be selected from sulfuric, hydrochloric, nitric, phosphoric, boric or hydrofluoric, more preferred from sulfuric or phosphoric, and any combination thereof. The most preferred mineral acid is sulfuric acid. The molar ratio of mineral acid to multifunctional acid can be from about 0.01 to about 99. A more preferred ratio is from about 0.1 to about 1.0. The most preferred ratio from about 0.2 to about 0.5.

At least one embodiment of the invention is directed towards an aqueous creping adhesive composition comprising about 0.01 to about 50 percent by weight of PAE resin and about 99.99 to about 50 weight percent water. The PAE resin is acidified with at least one multifunctional acid having one functional group selected from carboxyl and sulfonyl and at least one more functional group selected from carboxyl, sulfonyl, hydroxyl, lactone, phenol, amine, or heterocycle.

The multifunctional acid can be one selected from the list consisting of: citric, glutamic and sulfamic and the adhesive composition has a pH from about 2 to about 9. The aqueous creping composition can further comprise one or more polyols selected from ethylene glycol, diethylene glycol, triethylene glycol, propylene glycol, dipropylene glycol, polyethylene glycol, polypropylene glycol, glycerol, 1,4-butanediol, diethanolamine, triethanolamine, trimethylolpropane, erythritol, pentaerythritol, dipentaerythritol, arabitol, xylitol, ribitol, mannitol, sorbitol, galactitol, isomalt, maltitol, lactitol. The aqueous creping composition can also comprise one or more phosphate salts selected from monoammonium phosphate, diammonium phosphate, sodium and potassium tripolyphosphate, and phosphate salts formed in situ by adjusting the pH of the creping composition with phosphoric acid, and mixtures thereof. In at least one embodiment the aqueous composition includes the organic phosphates as described in published US Patent Application Number 2007/0208115.

At least one embodiment of the invention is directed towards a method of creping a paper web comprising the steps of:
a) applying to a rotating creping cylinder an adhesive composition comprising one or more polyaminoaminde epihalohydrin resins acidified with at least one multifunctional acid;
b) pressing the paper web against the creping cylinder to effect adhesion of the paper web to the creping cylinder; and
c) dislodging the paper web from the creping cylinder with a doctor blade.

BRIEF DESCRIPTION OF THE DRAWINGS

A detailed description of the invention is hereafter described with specific reference being made to the drawings in which.

DETAILED DESCRIPTION OF THE INVENTION

Figure 1:
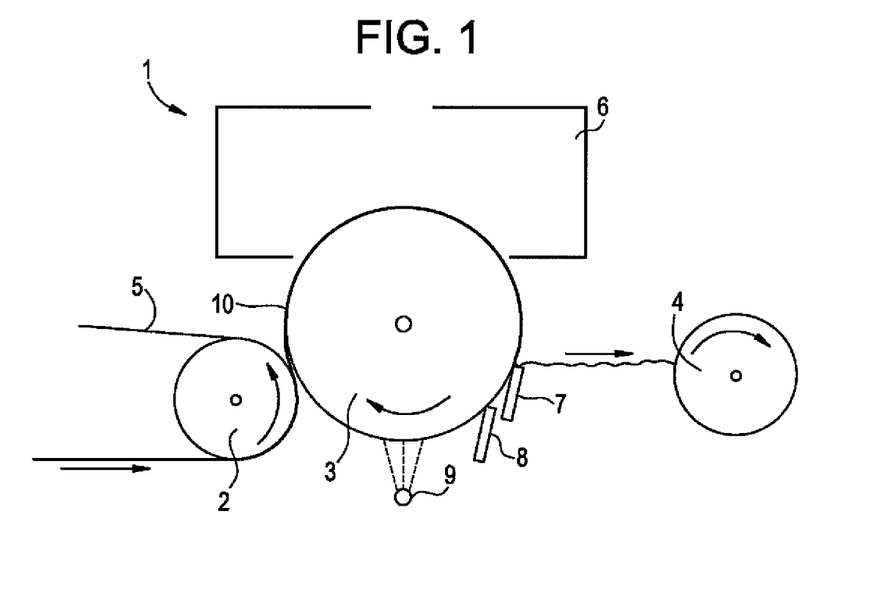
FIG. 1 is a schematic representation of a Yankee Dryer Apparatus using the novel PAE resin based adhesive.

Referring now to FIG. 1 there is shown a Yankee dryer apparatus (1) upon which the novel polyaminoamide-epichlorohydrin (PAE) resin is used. Prior Art creping adhesives are based on PAE resins, which are manufactured by crosslinking the polyaminoamide backbone with epichlorohydrin. As stated in foreign patents EP 1109971 and JP 2688950 as well as U.S. Pat. Nos. 7,291,695, 6,280,571, and 5,171,795 and US Published Applications 2002/0096288, and 2006/0207736 (all of whose contents are incorporated by reference in their entirety) the prior art resins are made by quenching the polymer crosslinking reaction with a mineral acid, most commonly hydrochloric or sulfuric acid as well as phosphoric, formic and acetic acid. These prior art resins however form adhesive coatings that are either too water soluble or not sufficiently rewettable which are not ideal for at least one of the environments present in the Yankee dryer apparatus (1).

The Yankee dryer apparatus (1) comprises a pressure roll (2) adjacent to a dryer cylinder (3) which is also adjacent to a reel (4). A felt (5) feeds a wet fiber web composed of cellulose fibers (10) from the pressure roll (2) to the dryer cylinder (3). The dryer cylinder (3) then rotates the wet fiber web through a drying hood (6) where the fiber web loses most of its moisture. A creping blade or doctor blade (7) removes the dry fiber web so as to facilitate the paper's absorptiveness and softness. A cleaning blade (8) removes extraneous material and smoothes out the remaining coating. The PAE resin is added by an applier (9). In at least one embodiment the applier is a spray boom.

Figure 2:
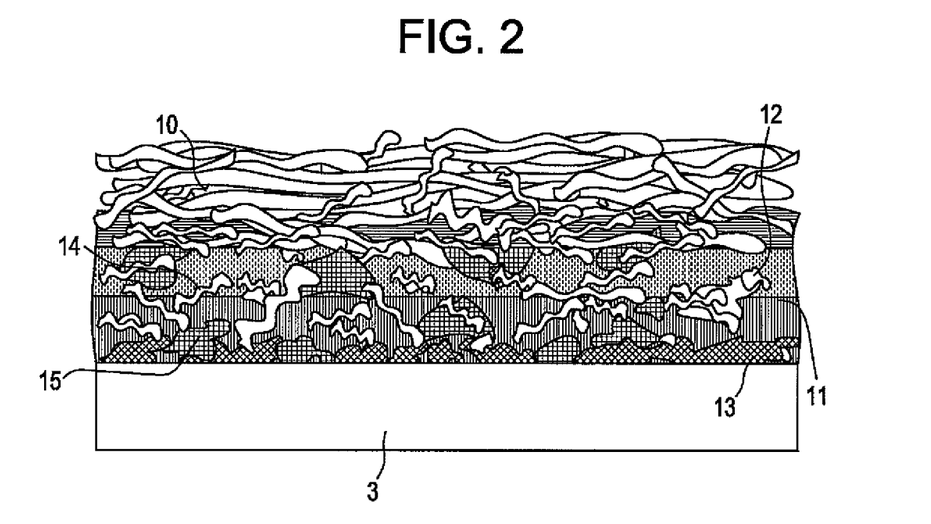
FIG. 2 is a cross sectional image of a cellulose fiber web bound to the surface of a Yankee Dryer Cylinder by the novel PAE resin based adhesive.

The physical requirements in a Yankee dryer apparatus (1) impose antagonistic properties on any adhesive used in the creping process. As illustrated in FIG. 2, the adhesive (11) binds a layer of fiber web (10) to the surface of the Yankee dryer cylinder (3). In addition, inorganic contaminants (12), calcium carbonate (13), hemicellulose (15), and cellulose debris (14) are present. When the fiber web (10) is first fed to the dryer cylinder (3) the adhesive must be strong enough to resist being washed off the dryer cylinder (3) by the high amounts of moisture present in the fiber web. However once the fiber web is dried, the adhesive must be soft enough to allow the creping blade to easily penetrate the adhesive to properly crepe the fiber web. An adhesive created using a PAE resin with a multifunctional acid possesses these antagonistic properties.

In at least one embodiment, a creping adhesive is formed from a PAE resin which is acidified with at least one multifunctional acid having one functional group selected from carboxyl and sulfonyl and at least one more functional group selected from carboxyl, sulfonyl, hydroxyl, lactone, phenol, amine, and heterocycle. Examples of multifunctional acids include but are not limited to oxalic, malonic, succinic, glutaric, adipic, pimelic, suberic, azelaic, sebacic, phthalic, isophthalic, terephthalic, citric, isocitric, aconitic, carballylic, glycolic, lactic, malic, tartaric, gluconic, maleic, fumaric, ascorbic, aspartic, glutamic, 4-hydroxy-benzoic, 2,4-dihydroxy benzoic, sulfamic, methansulfonic, 4-toluene sulfonic, xylene sulfonic, phenol sulfonic and the like, and any combination thereof.

In at least one embodiment, in addition to multifunctional acids, the PAE resin is also formed from one or more mineral acids. Appropriate mineral acids include but are not limited to sulfuric, hydrochloric, nitric, phosphoric, boric, hydrofluoric and the like, and any combination thereof. In at least one embodiment, the mineral acid is sulfuric or phosphoric. In at least one embodiment the molar ratio of mineral acid to multifunctional acid spans from about 0.01 to 99. In another embodiment, the ratio is about 0.1-1.0. In another embodiment, the ratio is 0.2-0.5.

The pH may be adjusted with one or more multifunctional acids or with one or more multifunctional acids and one or more mineral acids or a mixture thereof. In at least one embodiment the pH is adjusted with citric or sulfamic acids. In another embodiment, the pH is adjusted with sulfuric acid first followed by citric acid. Adjusting the pH can be used to modify the resin. Changing the pH can quench the crosslinking reaction, or can stabilize the product in storage, or can affect performance. In at least one embodiment, the pH is adjusted to about 2-8. In another embodiment, the pH is adjusted to 3-5.

In at least one embodiment, the PAE resins are water soluble, cationic thermosetting resins typically prepared by reacting one or more polyalkylene polyamines containing secondary amine groups and one or more dicarboxylic acid derivatives to form a polyaminoamide and then reacting the polyaminoamide with epihalohydrin to form the PAE resin. The preparation of PAE resins is described, for example, in U.S. Pat. No. 6,277,242 and U.S. Published Patent Applications 2005/0217817 and 2007/0151684, and Japanese Patent number JP 2688950B2, all of whose contents are hereby incorporated by reference in their entirety.

The polyamides can be made from the condensation polymerization of one or more organic dicarboxylic acid derivatives and one or more polyalkylene polyamines under conditions suitable for forming long-chain polyamides, for example at temperatures higher than about 130° C. for several hours with removal of water or alcohol byproducts. The resulting polyamide typically has weight average molecular weight of about 500 to about 500,000 Daltons as determined by gel permeation chromatography/multi-angle laser light scattering (GPC/MALLS) and a polymer Brookfield viscosity higher than about 100 cps for a 50% solution at 25° C. Water may be added at the end of the polymerization to make an aqueous polymer solution.

Generally, a sufficient amount of organic dicarboxylic acid derivative which is capable of reacting with substantially all of the primary amino groups but which is insufficient to react to any significant degree with the secondary amino groups of the polyalkylene polyamine is used. In at least one embodiment, the organic dicarboxylic acid derivative and polyalkylene polyamine are reacted in a molar ratio of about 0.8:1 to about 1.4:1. In another embodiment, the organic dicarboxylic acid derivative and the polyalkylene polyamine are reacted in a molar ratio of about 0.9:1 to about 1.0:0.9.

For purposes of this application the definition of "Organic dicarboxylic acid derivatives" is aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyamide is water soluble or water dispersible.

Appropriate organic dicarboxylic acids and their derivatives include but are not limited to maleic acid, succinic acid, glutaric acid, adipic acid, pimelic acid, suberic acid, azelaic acid, sebasic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl)ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

For purposes of this application the definition of "Polyalkylene polyamines" is organic compounds having two primary amine (—$NH_2$) groups and at least one secondary amine group where the amino nitrogen atoms are linked together by alkylene groups, provided no two nitrogen atoms are attached to the same carbon atoms. Polyalkylene polyamines include diethylenetriamine (DETA), triethylenetetraamine (TETA), tetraethylenepentaamine (TEPA), dipropylenetriamine, and the like.

In at least one embodiment the PAE resin is formed by reacting polyaminoamide with epichlorohydrin under controlled conditions. In at least one embodiment the polyaminoamide is diluted with water to a concentration of about 10 to about 50 weight percent, and the solution is cooled below about 25° C. An amount of epichlorohydrin sufficient to react with the desired amount of the secondary amino groups in the polyaminoamide is then slowly added in the solution. The mixture is then heated at a temperature of about 40° C. to about 100° C. until desired viscosity is reached, typically about 2 to about 8 hours. The preparation of suitable polyaminoamide-epichlorohydrin resins is described in U.S. Pat. No. 6,277,242, incorporated herein by reference in its entirety.

In at least one embodiment, the epihalohydrin is epichlorohydrin. In at least one embodiment, the mole ratio of epichlorohydrin to secondary nitrogen atoms in the polyaminoamide is less than about 0.5. In at least one embodiment, the polyaminoamide is the reaction product of diethylenetriamine and a dicarboxylic acid derivative selected from adipic acid, glutaric acid, DBE-2 dibasic ester, dimethyl glutarate and dimethyl adipate or a mixture thereof.

In at least one embodiment the adhesive is applied to the surface of a creping cylinder as a dilute aqueous solution. In at least one embodiment, the aqueous solution comprises about 0.01 to about 50 percent of a polyaminoamide-epichlorohydrin resin acidified according to at least one of the above mentioned procedures and about 99.99 to about 50 weight percent water. Those skilled in the art of creping adhesives will appreciate that the reason for such a larger percentage of water in the admixture is in part based on the need to only deposit a very thin layer of adhesive on the creping cylinder. In at least one embodiment, the thin layer is deposited with a spray boom.

In at least one embodiment, the adhesive composition of this invention further comprises one or more polyols, one or more phosphate salts or a mixture thereof. For purposes of this application the definition of the term "polyol" is simple water-soluble compositions of matter composed of alkylene groups and up to about six hydroxyl groups in which the alkylene groups are optionally interrupted by one or more O or NH groups. Polyols include but are not limited to ethylene glycol, diethylene glycol, triethylene glycol, propylene glycol, dipropylene glycol, polyethylene glycol, polypropylene glycol, glycerol, 1,4-butanediol, diethanolamine, triethanolamine, trimethylolpropane, erythritol, pentaerythritol, dipentaerythritol, arabitol, xylitol, ribitol, mannitol, sorbitol, galactitol, isomalt, maltitol, lactitol and the like.

In at least one embodiment, the polyols are selected from glycerol, ethylene glycol, sorbitol, diethylene glycol, propylene glycol, trimethylolpropane, polyethylene glycol, diethanolamine, and any combination thereof.

Phosphate salts include but are not limited to the sodium, potassium and ammonium salts of orthophosphate, pyrophosphate, metaphosphate, polyphosphate, phosphite and hypophosphite. Phosphate salts also include phosphate salts formed in-situ by adjustment of the pH of the creping composition with phosphoric acid. In an embodiment the phosphate salts are selected from monoammonium phosphate, diammonium phosphate, phosphate salts formed in situ by adjusting the pH of the creping composition with phosphoric acid, and mixtures thereof. In at least one embodiment the salts include the organic phosphates described in US Published Patent Application 2007/0208115.

The amount of polyols and/or phosphate salts in relation to the resin composition on a dry polymer basis typically ranges from about 0.5 to about 100 percent by weight. In at least one embodiment, between about 0.5 to about 20 percent by weight of the polyols and/or phosphate salts are used. It is to be understood that not all of the polyols produce similar results. In certain instances, depending upon the temperature employed, the particular resin composition used and other variables, routine experimentation will be necessary to determine the optimum polyol or phosphate salts to be used, as well as the particular amount to be employed in conjunction with the particular resin composition.

In at least one embodiment, a release aid that is also diluted, emulsified or dispersed to aqueous form is applied to the Yankee dryer cylinder along with the polymer adhesive. The release aid interacts with the adhesive materials on the Yankee dryer cylinder surface to avoid excessive coating build-up, to manage the sheet adhesion and to reduce doctor blade wear. Representative release aids include release oils composed of naphthenic, paraffinic, vegetable, mineral or synthetic oil and emulsifying surfactants. In order to form stable aqueous dispersions the release aid is typically formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

At least some embodiments of the adhesive compositions are formulated with functional additives, which improve the softness of the tissue paper. These functional additives include but are not limited to organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like.

The spraying applications described above may be further improved by a variety of means, for example by using spraybooms designed for double or triple coverage, by oscillating the sprayboom and by recirculation of the diluted creping aid composition from the outlet of the sprayboom to improve mixing and reduce the possibility of separation. In at least one embodiment the resin composition is applied according to one, some, or all of the methods and apparatus described in PCT 2004031475 and U.S. Pat. No. 7,048,826, the entire contents of which are hereby incorporated by reference in their entirety. In at least one embodiment, the composition, functional additives and/or release aid are applied to the creping cylinder by use of air (or gas) atomization, in addition to or instead of as aqueous solutions.

The foregoing may be better understood by reference to the following examples, which are presented for purposes of illustration and are not intended to limit the scope of the invention.

Example 1

Preparation of a Representative Adhesive Composition with Multifunctional Acid

A 1.5 L resin kettle reactor was charged with 326.04 g of a 50% aqueous solution of polyamidoamine and 815.79 g DI water. The solution was mixed at 400 rpm using an overhead stirrer (2.5" 6-blade impeller with 45° pitch). The vessel was purged of oxygen by diffusing nitrogen into the headspace at 0.3 L/min. The solution temperature was raised to 50° C. and 12.81 g epichlorohydrin were dispensed into the reactor as a single bolus under positive nitrogen pressure. The reaction temperature was maintained at 50° C. After 2 h, a sample of the reaction was withdrawn and was transferred to the small sample cup of a Brookfield rheometer. The small sample adapter was held at 25° C. by means of a temperature bath. The sample viscosity was measured once the sample temperature had stabilized at 25° C. (spindle #18 @ 30 rpm). The solution viscosity was measured hourly until the viscosity had exceeded 12 cPs. The viscosity was then measured in 15 min intervals (between sampling) until the target viscosity of 30 cPs was reached. Once the solution viscosity had reached (or passed) 30 cPs, the reaction was immediately quenched with citric acid until the solution pH reached approximately 3.7 at 50° C. (52.65 g). The solution was cooled to 30° C. and the final pH was measured as 3.6.

Example 2

Preparation of a Representative Adhesive Composition with Mineral and Multifunctional Acids A 1.5 L resin kettle reactor was charged with 361 g of a 50% aqueous polyamidoamine solution and 901.27 g DI water. The solution was mixed at 400 rpm using an overhead stirrer (2.5" 6-blade impeller with 90° pitch). The vessel was purged of oxygen by diffusing nitrogen into the headspace at 0.3 L/min. The solution temperature was raised to 50° C. and 12.62 g epichlorohydrin were dispensed into the reactor as a single bolus under positive nitrogen pressure. The reaction temperature was maintained at 50° C. After 2 h, a sample of the reaction was withdrawn. The sample was transferred to the small sample cup of a Brookfield rheometer. The small sample adapter was held at 25° C. by means of a temperature bath. The sample viscosity was measured once the sample temperature had stabilized at 25° C. (spindle #18 @ 30 rpm). The solution viscosity was measured hourly until the viscosity had exceeded 20 cPs. The viscosity was then measured in 15 min intervals (between sampling) until the target viscosity of ~30 cPs was reached. Once the solution viscosity had reached ~30 cPs, the reaction was immediately quenched with 123.57 g of a 15% solution of sulfuric acid until the solution pH reached approximately 7.0 at 50° C. The solution was cooled to 30° C. and the final pH of the solution was reduced to 4.0 by the addition of 51.70 g citric acid, which was charged as a solid.

Example 3

Shear Modulus and Peel Adhesion

The storage shear modulus, G', and the loss shear modulus, G'', were determined using a rheometer AR2000 (TA Instruments, New Castle, Del.). The complex shear modulus, |G*|, was calculated as $\sqrt{(G')^2+(G'')^2}$. Samples were prepared by casting a film from a 5% (w/w) polymer solution. The samples were dried in an oven at 95° C. overnight. The resulting film was punched with a die (8 mm in diameter) to make a sample disc. The disks were dried in vacuum oven at 110° C. for two hours and stored in a desiccator before use. Some film disks that had a tendency to retain more water could not be dried under vacuum because of formation of bubbles. These films were dried at 120° C. for 2 hours without vacuum. The geometry used for the analysis was 8-mm stainless steel parallel plates. The shear storage modulus was determined at 110° C., 1 Hz and 0.1% strain in oscillation mode.

The adhesion provided by the compositions of this invention was measured by means of a peel adhesion test. This test measures the force required to peel a cotton strip from a heated metal plate. First, an adhesive composition was neutralized with caustic to pH 7 to accelerate the crosslinking reaction. Then it was applied to the metal panel by means of a #40 coating rod. The adhesive was applied to the panel at about 13% polymer actives. The metal plate was heated to 60° C. (this temperature is referred to as the film cure temperature) and, at this point, a wet cotton strip was pressed into the film by means of a 1.9 kg cylindrical roller. The moisture content in the wet strip is about 60%. After the strip was applied, the metal plate is placed in a 105° C. oven for 15 minutes to dry the strip. The metal plate was then clamped in a tensile testing apparatus. One end of the cotton cloth was clamped in the pneumatic grip of the tester and the cloth was peeled from the panel at an angle of 180° and at a constant speed. During the peeling stage, the metal plate was controlled to a temperature of 100° C.

In the following examples, samples (PAE-1, PAE-2, PAE-3, PAE-4 and PAE-5) are terpolymers of adipic acid, diethylenetriamine and epichlorohydrin having an epichlorohydrin to secondary amine molar ratio of about 0.20 and an average molecular weight of about 300,000 to 800,000, which are acidified with various acids.

TABLE 1

| Sample ID | Polymer | Acid | pH | IG*I (kPa) | Peel-force (g/in) |
|---|---|---|---|---|---|
| 1A | PAE-1 | Sulfuric | 3.7 | 970 | 599 |
| 1B | PAE-1 | Hydrochloric | 4.0 | 5500 | 322 |
| 1C | PAE-1 | Phosphoric | 3.6 | 79 | 579 |
| 1D | PAE-1 | Acetic | 3.8 | 21 | 117 |
| 1E | PAE-1 | Formic | 3.4 | 54 | 368 |
| 1F | PAE-1 | Citric | 3.1 | 11 | 652 |

*Film disks were dried without vacuum at 120° C. for 2 hrs.

Table 1 shows that PAE made with common mineral acids, sulfuric or hydrochloric, forms films with a very high shear modulus. The shear modulus is lower when phosphoric acid is used, but carboxylic acids, acetic, formic and citric, produce films with significantly lower shear modulus. The shear modulus correlates with the softness of a polymer film. The lower the shear modulus, the softer the film. Thus, the use of a carboxylic acid for manufacturing PAE adhesive results in much softer adhesive films, which can be beneficial for the creping process at low moisture. However, when peel adhesion data are compared, only citric acid appears to be superior to mineral acids, suggesting that having multiple carboxyl and hydroxyl functions is beneficial for softness of an adhesive film.

Example 4

Glass Transition Temperature ($T_g$), Shear Modulus and Peel Adhesion

A TA 2920 differential scanning calorimeter DSC (TA Instruments, New Castle, Del.) is used to measure the glass transition temperature of representative polymer compositions. Polymer samples were prepared by casting films at 105° C. The DSC instrument is calibrated with an indium standard. The sample size for DSC analysis is about 10-15 mg. The sample was heated at a heating rate of 10° C./min. The glass transition temperature of polymer was determined from the second scan using a half-height method.

TABLE 2

| Sample ID | Polymer | Acid | Polymer actives (wt %) | pH | $T_g$ (°C.) | IG*I (kPa) | Peel-force (g/in) |
|---|---|---|---|---|---|---|---|
| 2A | PAE-2 | sulfuric | 12.84 | 3.9 | 68 | 23 | 321 |
| 2B | PAE-2 | lactic | 14.10 | 4.1 | 26 | | 304 |
| 2C | PAE-2 | malic | 14.27 | 3.9 | 32 | 2.8 | 242 |
| 2D | PAE-2 | citric | 14.14 | 3.8 | 53 | 12 | 440 |
| 2E | PAE-2 | adipic | 13.34 | 4.4 | 18 | | 131 |
| 2F | PAE-2 | glutamic | 12.19 | 4.8 | 38 | 3.8 | 617 |
| 2G | PAE-2 | sulfamic | 13.92 | 3.4 | 41 | | 360 |

*All films were dried without vacuum.

Table 2 demonstrates that multifunctional acids resulted in films having a lower glass transition temperature ($T_g$) and a lower shear modulus compared to sulfuric acid. A lower glass transition temperature indicates intimate attractive interactions of acids with the polymer chains and correlates with the film softness, which is beneficial for the creping process under low moisture conditions. The use of multifunctional acids such as glutamic, citric and sulfamic has also resulted in higher peel adhesion.

Example 5

Moisture Retention 30 mL of 5% solution of the adhesive composition was prepared in deionized water and poured into a preweighed plastic dish. The dish with the solution was placed into a convection oven and dried for 4 hrs at 95° C. The dish with the dry film was removed from the oven and placed in a desiccator to cool for ~15 min. The dish with the dry film was weighed and the film weight (W1) is calculated by subtracting the weight of the empty dish. Then the dish was placed in a convection oven again and further dried at 105° C. for at least 16 hrs to remove the remaining water from the film. The completely dry film was placed in a desiccator to cool and weighed. The weight of the completely dried film (W2) was calculated by subtracting the weight of the empty dish. The percent of retained moisture after 4 hrs at 95° C. was calculated as the difference between W2 and W1.

TABLE 3

| Sample ID | Polymer | Acid | pH | % moisture after drying for 4 hrs at 105° C. |
|---|---|---|---|---|
| 3A | PAE-3 | Sulfuric | 4.1 | 3.4 |
| 3B | PAE-3 | phosphoric | 4.0 | 5.4 |
| 3C | PAE-3 | lactic | 4.0 | 10.9 |
| 3D | PAE-3 | malic | 4.0 | 9.8 |
| 3E | PAE-3 | tartaric | 4.1 | 7.2 |
| 3F | PAE-3 | citric | 4.0 | 12.7 |
| 3G | PAE-3 | gluconic | 4.0 | 16.9 |
| 3H | PAE-3 | isoascorbic | 4.1 | 15.3 |

Table 3 shows that the use of multifunctional acids to acidify PAE solutions, produce adhesive films that tend to retain more moisture than films of adhesives prepared with mineral acids, sulfuric or phosphoric. Moisture is a very efficient plasticizer for PAE materials. A higher moisture level in the film normally results in a softer film and is correlated with a lower shear modulus in Example 4.

Example 6

Effect of Acid Mixture

Mineral acid could be used in a combination with a multifunctional acid to produce low modulus films. Mineral acids tend to be stronger than multifunctional acids and, therefore, a smaller amount is required to achieve the same product pH. This may be useful when rapid quenching of the crosslinking reaction is desired for a more efficient control over production. Moreover, mineral acids tend to be less expensive and a partial substitution of multifunctional acid with mineral acid could provide product cost savings. The two or more acids can be charged consecutively in any order or as a mixture.

TABLE 4

| Sample ID | Polymer | Mw (Da) | Acid | Polymer actives (wt %) | Sulfuric acid (wt %) | Multi-functional acid (wt %) | % Total acid/polymer actives | pH | IG*I (kPa) |
|---|---|---|---|---|---|---|---|---|---|
| 4A | PAE-4 | 370,000 | citric | 14.87 | 0.0 | 6.8 | 45.7 | 4.0 | 29 |
| 4B | PAE-4 | 370,000 | sulfuric/citric | 14.02 | 1.3 | 3.6 | 34.5 | 3.9 | 17 |
| 4C | PAE-5 | 540,000 | sulfamic | 15.30 | 0.0 | 5.1 | 33.2 | 3.9 | 6.2 |
| 4D | PAE-5 | 540,000 | sulfuric/sulfamic | 14.37 | 1.2 | 2.7 | 27.0 | 3.9 | 5.8 |

Table 4 shows that, compared to use of a multifunctional acid alone, citric or sulfamic, charging sulfuric acid first followed by a multifunctional acid requires a smaller amount of the total acid to quench the crosslinking reaction and adjust the pH to about 4. As demonstrated by the complex shear modulus, |G*|, data, the use of two acids produced films that were as soft or even softer compared to citric or sulfamic acids alone. This could be beneficial for the creping process under low moisture conditions.

Example 7

Effect of Cure Temperature

This example demonstrates how peel adhesion of various adhesive compositions is affected by the film cure temperature. The peel test method is the same as in example 3 except the film cure temperature was varied from 60 to 100° C. The higher film cure temperature results in a dryer adhesive film before the sheet is applied. A higher film cure temperature and a dryer film represent conditions encountered during low moisture creping. If the film is too dry or is not easily rewettable, it may not be soft enough to interact with the wet cellulose sheet, which is unfavorable for adhesion development.

Figure 3:
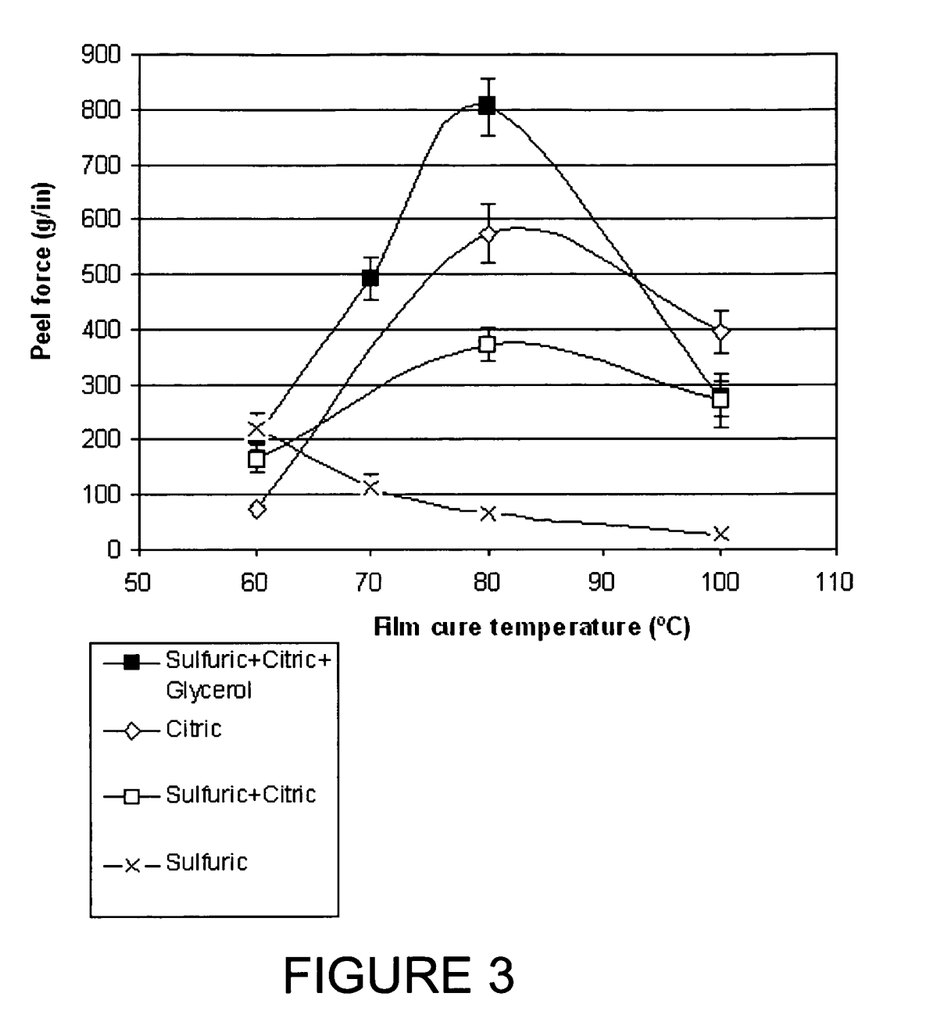
FIG. 3 is a graph plotting adhesion with temperature.

Data in Table 5 and FIG. 3 show that the PAE adhesive acidified with sulfuric acid quickly looses its adhesion as the film temperature increases from 60 to 80 and to 100° C. In contrast, the PAE adhesive acidified with citric acid or a mixture of sulfuric and citric acids, gains adhesion as the temperature increase from 60 to 80° C. and then drops down at the cure temperature of 100° C., but the adhesion level at 100° C. is still higher than at 60° C. This behavior demonstrates that PAE adhesives prepared with citric acid should be tolerable to low moisture conditions and could exhibit a wider operating window with regard to moisture and temperature variations compared to the conventional adhesives prepared with sulfuric acid.

Adhesion of the PAE acidified with citric acid can further be improved by adding a polyol modifier exemplified by glycerol.

TABLE 5

| Sample ID | Polymer | Acid | Modifier | Film cure temp. (° C.) | Peel Force (g/in) Average | Std. Dev. |
|---|---|---|---|---|---|---|
| 5A | PAE-4 | Sulfuric | None | 60 | 220 | 28 |
|  |  |  |  | 70 | 114 | 23 |
|  |  |  |  | 80 | 67 | 9 |
|  |  |  |  | 100 | 28 | 6 |
| 5B | PAE-4 | Citric | None | 60 | 75 | 6 |
|  |  |  |  | 80 | 574 | 53 |
|  |  |  |  | 100 | 396 | 38 |
| 5C | PAE-4 | Sulfuric + Citric | None | 60 | 165 | 26 |
|  |  |  |  | 80 | 373 | 32 |
|  |  |  |  | 100 | 270 | 48 |
| 5D | PAE-4 | Sulfuric + Citric | 1% Glycerol | 60 | 206 | 25 |
|  |  |  |  | 70 | 493 | 39 |
|  |  |  |  | 80 | 806 | 53 |
|  |  |  |  | 100 | 274 | 32 |

Changes can be made in the composition, operation, and arrangement of the method of the invention described herein without departing from the concept and scope of the invention as defined in the claims.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments described herein. All patents, patent applications, and references mentioned herein are hereby incorporated by reference in their entirety.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of creping a paper web comprising the steps of:

a) applying to a rotating creping cylinder an adhesive composition comprising one or more polyaminoamide epihalohydrin resins acidified with at least one multifunctional acid;

b) pressing the paper web against the creping cylinder to effect adhesion of the paper web to the creping cylinder; and c) dislodging the paper web from the creping cylinder with a doctor blade wherein the polyaminoamide epihalohydrin resins are prepared by reacting the polyaminoamide with about 0.1 to about 0.3 molar equivalents of epichlorohydrin, based on secondary amino groups of the polyaminoamide;

wherein the composition exhibits greater adhesion at film cure temperature from about 70° C. to about 100° C. than the same resin acidified with sulfuric acid.

2. The method of claim 1 wherein the composition comprises a polyaminoamide epihalohydrin resin acidified with at least one multifunctional acid having at least two functional groups one being a first functional group and one being a second functional group, the first functional group selected from carboxyl and sulfonyl and the second functional group selected from carboxyl, sulfonyl, hydroxyl, lactone, phenol, amine, or heterocycle.

3. The method of claim 2 wherein the polyaminoamide epihalohydrin resins are prepared by reacting a polyaminoamide prepared by reacting one or more aliphatic or aromatic dicarboxylic acid derivatives with one or more polyalkylene polyamines in a mole ratio of about 0.8:1 to about 1.4:1 with about 0.01 to about 1.8 molar equivalents of epihalohydrin, based on secondary amino groups of the polyaminoamide.

4. The method of claim 2 wherein the polyaminoamide epihalohydrin resins have a weight-average molecular weight of about 10,000 to about 5,000,000 Daltons.

5. The method of claim 2 wherein the epihalohydrin is epichlorohydrin.

6. The method of claim 2 wherein the polyaminoamide epihalohydrin resins are prepared by reacting the polyaminoamide with about 0.05 to about 0.8 molar equivalents of epichlorohydrin, based on secondary amino groups of the polyaminoamide.

7. The method of claim 2 wherein the polyaminoamide is the reaction product of diethylenetriamine and a dicarboxylic acid derivative selected from adipic acid, glutaric acid, DBE-2 dibasic ester, dimethyl glutarate and dimethyl adipate or a mixture thereof.

8. The method of claim 2 wherein the composition has a complex shear modulus which is no greater than 500 kPa and the composition can retain more than 5% moisture after drying for 4 hours at 105 degrees C.

9. The method of claim 2 wherein the polyaminoamide epihalohydrin resin is a terpolymer of adipic acid, diethylenetriamine and epichlorohydrin.

10. The method of claim 2 wherein at least one multifunctional acid is selected from oxalic, malonic, succinic, glutaric, adipic, pimelic, suberic, azelaic, sebacic, phthalic, isophthalic, terephthalic, citric, isocitric, aconitic, carballylic, glycolic, lactic, malic, tartaric, gluconic, maleic, fumaric, ascorbic, aspartic, glutamic, 4-hydroxy-benzoic, 2,4-dihydroxy benzoic, sulfamic, methanesulfonic, 4-toluene sulfonic, xylene sulfonic, phenol sulfonic.

11. The method of claim 2 wherein the first and second functional groups are not the same kind of group.

12. The method of claim 2 wherein the composition further comprises one or more mineral acids selected from sulfuric, hydrochloric, nitric, phosphoric, boric or hydrofluoric, more preferred from sulfuric or phosphoric, most preferred sulfuric acid.

13. The method of claim 2 wherein a molar ratio of mineral acid to multifunctional acid is from about 0.01 to about 99, more preferred from about 0.1 to about 1.0, most preferred ratio from about 0.2 to about 0.5.

14. The method of claim 2 wherein the composition is an aqueous creping adhesive composition comprising about 0.01 to about 50 percent by weight of PAE resin and about 99.99 to about 50 weight percent water, the PAE resin having been acidified with at least one multifunctional acid having one functional group selected from carboxyl and sulfonyl and at least one more functional group selected from carboxyl, sulfonyl, hydroxyl, lactone, phenol or amine.

15. The method of claim 2 wherein the multifunctional acid is one selected from the list consisting of: citric, glutamic and sulfamic and has a pH from about 2 to about 9.

16. The method of claim 2 wherein the aqueous creping composition further comprises one or more polyols selected from ethylene glycol, diethylene glycol, triethylene glycol, propylene glycol, dipropylene glycol, polyethylene glycol, polypropylene glycol, glycerol, 1,4-butanediol, diethanolamine, triethanolamine, trimethylolpropane, erythritol, pentaerythritol, dipentaerythritol, arabitol, xylitol, ribitol, mannitol, sorbitol, galactitol, isomalt, lactitol.

17. The method of claim 2 wherein the aqueous creping composition further comprises one or more phosphate salts selected from monoammonium phosphate, diammonium phosphate, phosphate salts formed in situ by adjusting the pH of the creping composition with phosphoric acid, and mixtures thereof.

18. The method of claim 2 wherein the molar ratio of multifunctional acid to the PAE resin secondary amines is from about 0.01 to about 5.0.

\* \* \* \* \*